Figure 1:
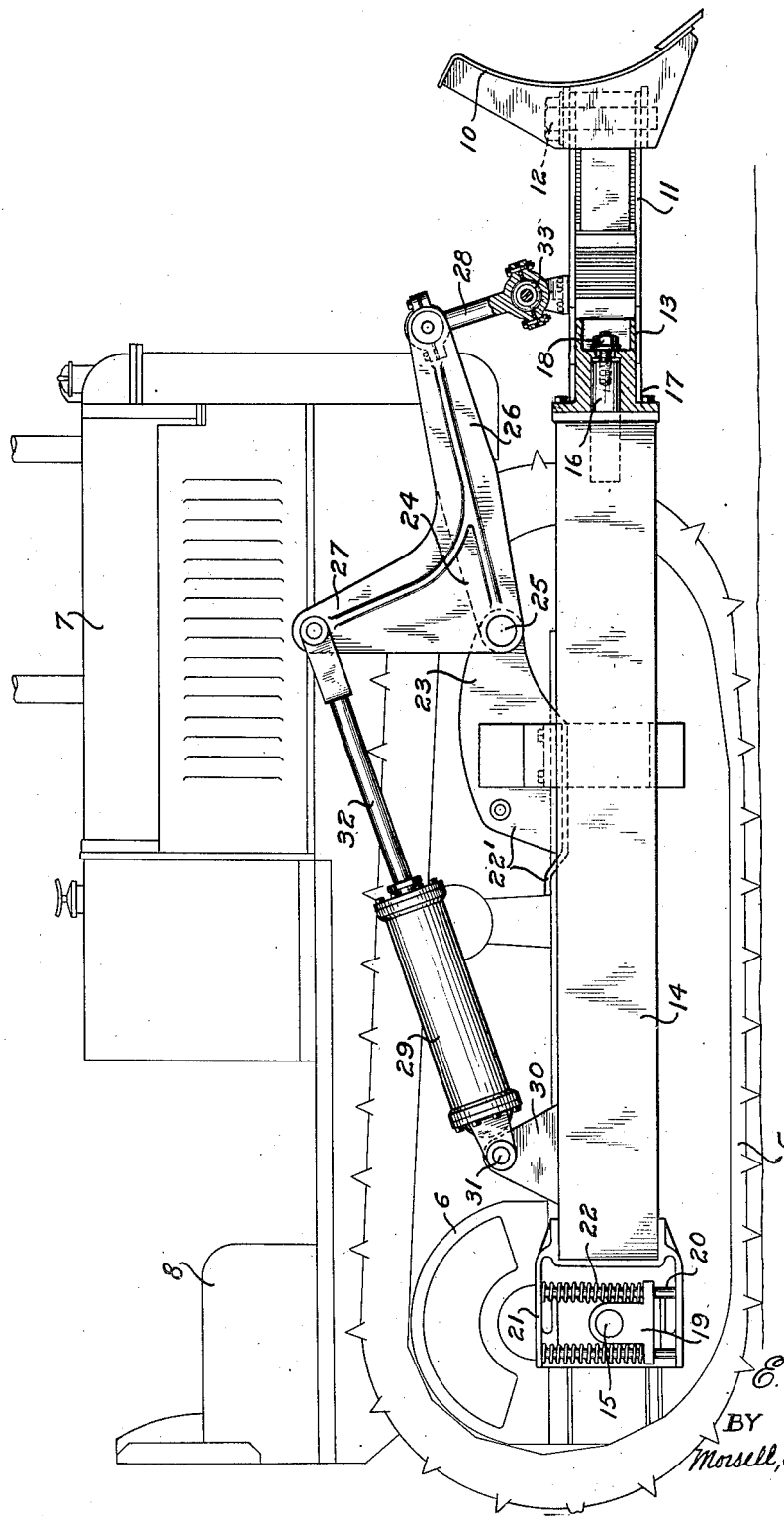

Dec. 15, 1936.  E. B. MALOON  2,064,022

TRAILBUILDER

Filed Oct. 26, 1935  2 Sheets-Sheet 1

INVENTOR.
E. B. Maloon
BY
Morsell, Liebert & Morsell
ATTORNEYS.

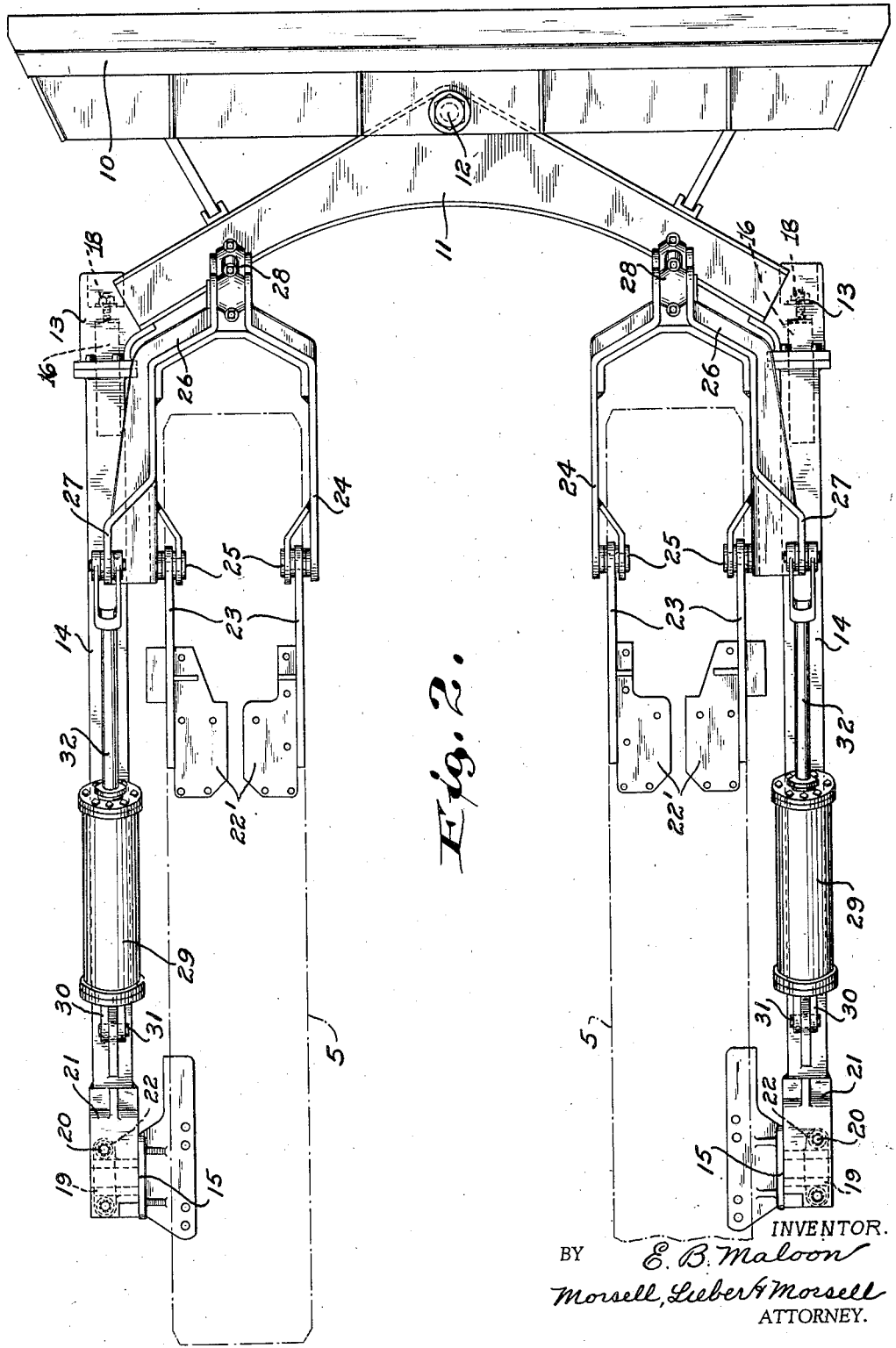

Patented Dec. 15, 1936

2,064,022

UNITED STATES PATENT OFFICE 2,064,022

TRAILBUILDER

Earl B. Maloon, Milwaukee, Wis., assignor to The Heil Co., Milwaukee, Wis., a corporation of Wisconsin Application October 26, 1935, Serial No. 46,861

3 Claims. (Cl. 37—144)

The present invention relates in general to improvements in the art of grading land for road building and analogous purposes, and relates more specifically to improvements in the construction and operation of grading machines of the type known in the industry as trailbuilders.

Generally defined, an object of the present invention is to provide an improved trailbuilder which is simple, compact and durable in construction, and which is moreover highly efficient and flexible in operation.

It has heretofore been common practice to provide a trailbuilder attachment for tractors, comprising a scraping or grading blade positioned across the front of the vehicle and suspended therefrom by side pushers or arms pivotally associated with the rear axle of the tractor. These devices are ordinarily provided with some means for swinging the blade supporting arms so as to raise or lower the blade relative to the ground, and in some instances hydraulic jacks are used for this purpose. The adjusting jacks and other mechanisms of these prior trailbuilders were ordinarily mounted upon the tractor frame or chassis above and laterally adjacent to the side arms or pushers, and when thus disposed, they materially interfered with the operator's view of the grading blade and of the ground adjacent to this blade. When these prior trailbuilders were applied to traction vehicles of the endless track type, the hydraulic jacks formerly used, also tended to undesirably spread and stress the endless track supporting frames, and the prior blade adjusting mechanisms were moreover relatively complicated and cumbersome thus making it difficult to apply the same to the propelling tractor and to maintain them in effective operating condition. Then too, it was difficult with these prior assemblages, to insure most effective application of the actuating power, without undesirably complicating the structure, thus making the prior devices relatively objectionable for numerous reasons.

The present invention therefore contemplates provision of an improved trailbuilder assemblage which substantially eliminates the above mentioned objectionable features, and which is extremely simple in structure.

Another specific object of the present invention is to provide a grader attachment especially applicable to tractors of the endless tread type, which can be easily applied to the propelling vehicle without undesirably marring the latter, and which when applied, will produce least obstruction to the operator's view.

A further specific object of the invention is to provide a new and useful scraper appliance for land, which will prevent interfering with the normal functioning of the propelling tractor, and which will not tend to spread or excessively stress the traction member or frames during adjustment of the scraper blade.

Still another specific object of the invention is to provide a durable hydraulically actuated grader assemblage, wherein the actuating power is most effectively applied with simple and conveniently manipulable hydraulic jacks.

An additional specific object of the present invention is to provide a trailbuilder unit which is attachable as such to various types of traction devices, which can be quickly adjusted to meet desired operating conditions, and which can be manufactured and maintained in operating condition at moderate cost.

These and other objects and advantages will be apparent from the following detailed description.

A clear conception of an embodiment of the present invention, and of the mode of constructing, applying and of operating trailbuilders built in accordance with the improvement, may be had by referring to the drawings accompanying and forming a part of this specification wherein like reference characters designate the same or similar parts in the several views.

Fig. 1 is a part sectional side elevation of one of the improved trailbuilder units, showing the same applied to a tractor of the endless track or thread type; and Fig. 2 is a top view of the trailbuilder showing the tractor tread mechanisms in dot-and-dash lines.

While the invention has been depicted herein as being specifically applied to an adjustable blade type of trailbuilder unit especially adapted for cooperation with an endless track type of propelling tractor, it is not desired to unnecessarily restrict the scope by such specific embodiment, since some of the novel features may be more generally applicable to other types of mechanism.

Referring to the drawings, the endless tread tractor shown therein and with which the improved trailbuilder is especially cooperable, comprises in general a pair of laterally spaced endless tracks or tread mechanisms each having a continuous tread 5 cooperable with driving and guiding sprockets carried by side frames 6 which are pivotally attached to the rear portion of the tractor chassis upon which the propelling motor 7 and the operator's seat 8 are mounted. This type of tractor is of well known construction, and is partially illustrated in light lines in Fig. 1, while only the endless tread mechanisms have been shown in dot-and-dash lines in Fig. 2. These tractors are ordinarily provided with means for guiding and for preventing lateral displacement of the forward portions of the treads 5 and frames 6, and any attachments which are applied to the tractors should preferably avoid tending to produce such displacement.

The improved trailbuilder or scraper attachment forming the subject of the present invention, comprises in general a scraper or grading blade 10 disposed forwardly of and extending transversely across the path of travel of the tractor near the ground; a transverse support 11 located in back of the blade 10 and to which the latter is adjustably attached by means of a central vertical locking pivot 12; a rearwardly extending pusher beam member 13 rigidly attached by welding to each of the opposite ends of the support 11; a pair of pusher arms 14 each of which is longitudinally pivotally attached at its forward end to the adjacent beam member 13, and each having a rear transverse end pivot 15 associated with the adjacent tread frame 6; and improved jack mechanisms for swinging the arms 14 about their alined pivots 15 to either independently or simultaneously raise and lower the opposite ends of the scraper blade 10.

The grader bowl or blade 10 is of relatively standard construction being provided with a removable and reversible scraping edge, and the adjusting and locking pivot 12 is provided for the purpose of permitting disposition of the blade 10 either normal to the line of travel of the vehicle, or at an oblique angle relative thereto. The support 11 is formed to accommodate such normal and angular disposition of the blade 10, and these parts are preferably of sturdy construction. The longitudinal pivotal connection which is interposed between each of the pusher members 13 and the front end of the adjacent pusher arm 14, is shown in detail in Fig. 1, and comprises a pivot pin 16 welded or otherwise rigidly secured to the end of the arm 14; a swivel block 17 permanently associated with the rear end of the corresponding member 13 and having a bore coacting with the pivot pin 16; and a stud and nut 18 for preventing longitudinal separation of the pivot pin 16 and the block 17 while permitting a free swivel action between the coacting parts. It is to be noted that the ends of the support 11 and the members 13 constitute swivel extensions of the arms 14, and that all of these parts combined, constitute the blade pushers.

The rear pivots 15 are preferably alined and of durable construction, and each of these pivots 15 coacts with a bearing 19 so as to permit not only oscillation, but also slight lateral angular displacement of the bearing 19, relative to its supporting pivot 15. Each bearing 19 is slidably cooperative with parallel guide rods 20 secured to a saddle housing 21 which is attached to the rear end of the corresponding pusher arm 14, and compression springs 22 which embrace the rods 20, react against the bearings 19 and housings 21 as shown, thereby providing some resiliency or cushioning between the arms 14 and the pivots 15. With this assemblage of elements, it will be apparent that the pivots 15 provide for upward, downward and slight lateral swinging of the pusher arms 14, while the pivot pins 16 provide for tilting of the support 11 about the longitudinal axes of the arms 14, thus permitting either independent or simultaneous raising or lowering of the opposite ends of the blade 10 without causing undesirable binding or stressing of the blade suspending structure.

The improved jack mechanism for adjustably positioning the blade 10 during normal propulsion thereof along the groove by the tractor, comprises a bracket 22' secured to each of the tread frames 6 and having spaced bearing portions 23 located at opposite sides of its supporting frame 6; a bell-crank 24 swingably mounted upon the portions 23 of each bracket 22' by means of alined pivots 25, and having forwardly and upwardly projecting lever arms 26, 27 respectively; a link 28 connecting the swinging end of each lever arm 26 with either the adjacent end of the support 11, the side beam member 13, or the arm 14; and a pair of hydraulic jacks each having a cylinder 29 swingably attached directly to ears 30 formed integral with the rear portion of the adjacent pusher arm 14 by a pivot pin 31, and a piston slidable within the cylinder 29 and having a rod 32 pivotally attached to the swinging end of the lever arm 27 of the adjacent bell-crank 24. The brackets 22' may be formed of metal plate and can be rigidly attached to the tread frames 6 within the treads 5, by bolts or otherwise, so that the bearing portions 23 will not interfere with the treads. The bell-cranks 24 may likewise be formed of metal plates welded or otherwise united to form integral rigid units, and the supporting portion of each bell-crank 24 is preferably provided with bifurcations spanning the adjacent bracket portion 23 and penetrated by the corresponding pivot 25, as shown in Fig. 2, thereby providing an effective pivotal mounting for each bell crank. The forwardly projecting lever arm 26 of each bell-crank 24 is U-shaped in order to clear the adjacent track, and each connecting link 28 has its opposite ends connected by universal joints 33 with the swinging end of the adjacent lever arm 26 and with the adjacent end of the pusher assemblage. The upwardly projecting arm 27 of each bell-crank 24, is preferably disposed in the longitudinal vertical central plane of the corresponding pusher arm 14 as illustrated in Fig. 2 in order to eliminate side pressure when the jack is operating.

The hydraulic jacks are of rather well known construction, and are controllable by means of a valve (not shown) located near the operator to either independently or simultaneously operate the jacks. Ordinarily, these jacks are of the double acting type, and the liquid such as oil is delivered to the cylinders 29 by a pump of the gear type (not shown). The system for controlling the operation of these hydraulic jacks forms no part of the present improvement with the exception that the jacks should be independently or simultaneously operable so as to either independently raise or lower the opposite ends of the blade 10 and support 11, or to simultaneously bodily raise or lower these parts. The jack cylinders 29 are moreover preferably mounted upon the pusher arms 14, with their central longitudinal axes disposed in the longitudinal vertical central planes of the corresponding pusher arms 14, thereby avoiding side thrust upon the arms 14 when the jacks are operated.

During normal operation of the improved trailbuilder, the unit may be mounted upon the tractor in the manner hereinabove described, and may thereafter be conveniently manipulated by the operator occupying the seat 8. The grading blade 10 may be bodily raised by simultaneously causing the piston rods 32 of both jacks, to move rearwardly, and may be lowered by simultaneously causing these rods 32 to move forwardly. The blade 10 may also be tilted either by actuating one jack alone, or by actuating both jacks in reverse directions, and the pivots 15, 16 will effectively accommodate the blade tilting motion which naturally tends to throw the pusher arms 14 slightly out of parallel position relative to each other. Since the actuating jacks for the pushers are mounted directly upon the pushers, they not only avoid obstruction to the view of the operator, but they also prevent production of pressures which tend to move the arms laterally when the jacks are operated. This mounting of the jack mechanisms directly upon the pushers, moreover, simplifies the assemblage by enabling the use of relatively simple bell-cranks 24 and supporting brackets 22' therefor, and furthermore enhances the unitary construction of the trailbuilder attachment.

From the foregoing description it will be apparent that the present invention provides a scraper attachement or unit, which is simple and durable in construction, and which is extremely flexible and highly efficient in operation. The unit may be conviently applied to a tractor, and may be manufactured, applied and subsequently maintained in operating condition at minimum cost. The cost of construction may be minimized by forming the parts of welded sheet metal structure, and the assemblage presents a neat and sturdy appearance. The improved assemblage obviously avoids subjecting the tractor structure to undesirable stress, since the pusher and actuating forces are all confined well within the massive side beam members and arms. While the lifting force has been shown as being applied to the forward ends of the arms 14 through the end portions of the support 11 and through the beams 13, in order to avoid interfering with the treads 5 of a particular type of tractor, the bell-crank 24 and connecting link 28 may obviously be caused to cooperate directly with any of these elements if the tractor structure will permit.

It should be understood that it is not desired to limit the invention to the exact details of construction and to the precise mode of operation herein shown and described, for various modifications within the scope of the claims may occur to persons skilled in the art.

I claim:

1. A scraper attachment for an endless tread tractor having endless track frames pivotally supported at their rear ends, said attachment comprising, a scraper blade extending across the front end of the tractor, a pusher arm connecting each end of said blade with the adjacent track frame near the pivotal support thereof, a resilient pivotal connection between the rear end of each pusher arm and the adjacent track frame, a bracket secured directly to each track frame within the corresponding endless track, a bell crank pivotally suspended from each of said brackets, a universal motion-transmitting connection between one arm of each of said bell cranks and the adjacent pusher arm, and a hydraulic jack mounted directly upon each pusher arm and coacting with the other arm of the adjacent bell crank.

2. A scraper attachment for an endless tread tractor having endless track frames pivotally supported at their rear ends, said attachment comprising, a scraper blade extending across the front end of the tractor, a pusher arm connecting each end of said blade with the adjacent track frame near the pivotal support thereof, a resilient pivotal connection between the rear end of each pusher arm and the adjacent track frame, a bracket secured directly to each track frame within the corresponding endless track, a bell crank pivotally suspended from each of said brackets, a universal motion-transmitting connection between one arm of each of said bell cranks and the adjacent pusher arm, and a hydraulic jack mounted directly upon each pusher arm and coacting with the other arm of the adjacent bell crank, said jacks being operable to independently raise or lower the opposite ends of said scraper blade.

3. A scraper attachment for an endless tread tractor having an endless track supporting frame on each side of the tractor swingable about a rear pivot, said attachment comprising, a scraper blade disposed in front of the tractor, a pair of pusher arms each having its front end pivotally associated with said blade and its rear end resiliently pivotally attached to the rear portion of the adjacent track supporting frame, a bracket secured directly to each track supporting frame within the corresponding endless track, a lever pivotally suspended from each of said brackets and universally movably connected to the front end of the adjacent pusher arm, and a hydraulic jack mounted directly upon each pusher arm and operatively connected to the adjacent lever, said jacks being operable to independently raise or lower the opposite ends of said scraper blade.

EARL B. MALOON.